United States Patent
Asfar et al.

[11] Patent Number: 5,970,129
[45] Date of Patent: Oct. 19, 1999

[54] ADMINISTRATIVE MONITORING SYSTEM FOR CALLING CARD FRAUD PREVENTION

[75] Inventors: Hooshmand Asfar, Leawood; Shailesh Potnis, Overland Park, both of Kans.

[73] Assignee: Sprint Communications Co. L.P., K.C., Mo.

[21] Appl. No.: 09/063,903

[22] Filed: Apr. 21, 1998

Related U.S. Application Data

[63] Continuation of application No. 08/884,834, Jun. 30, 1997, abandoned.

[51] Int. Cl.$^6$ ................................................. H04M 17/00
[52] U.S. Cl. .......................... 379/144; 379/145; 455/410; 455/424
[58] Field of Search ........................... 379/113–114, 112, 379/115, 118, 196, 197, 144–145, 188–189, 133–134, 13–15; 455/410, 423, 424

[56] References Cited

U.S. PATENT DOCUMENTS

| | | |
|---|---|---|
| 4,893,330 | 1/1990 | Franco ..................................... 379/145 |
| 5,345,595 | 9/1994 | Johnson et al. . | 
| 5,351,290 | 9/1994 | Naeini et al. ............................ 379/145 |
| 5,392,335 | 2/1995 | Reeder . |
| 5,448,633 | 9/1995 | Jamaleddin et al. . |
| 5,463,681 | 10/1995 | Vaios et al. . |
| 5,566,234 | 10/1996 | Reed et al. . |
| 5,590,181 | 12/1996 | Hogan et al. . |
| 5,596,632 | 1/1997 | Curtis et al. . |
| 5,602,906 | 2/1997 | Phelps ..................................... 379/145 |
| 5,627,886 | 5/1997 | Bowman ................................. 379/145 |
| 5,659,593 | 8/1997 | Tzvieli .................................... 379/115 |

*Primary Examiner*—Curtis A. Kuntz
*Assistant Examiner*—Duc Nguyen
*Attorney, Agent, or Firm*—Harley R. Ball; Bruce C. McClelland

[57] ABSTRACT

An improved method and apparatus for administrative monitoring of a calling card fraud prevention system is disclosed. An administrative monitor continuously oversees the functions performed by components of the fraud prevention system and thereby detects abnormalities in system performance. The administrative monitor regularly compiles status information from system components and applies a set of predefined thresholds in order to determine whether abnormalities are present. Upon detection of an abnormality, the administrative monitor generates a health warning, which is displayed on workstation monitors to provide notice of the problem.

14 Claims, 5 Drawing Sheets

ADMINISTRATIVE MONITORING SYSTEM FOR CALLING CARD FRAUD PREVENTION

RELATED APPLICATIONS

This is a continuation of prior application Ser. No. 08/884,834, filed Jun. 30, 1997, now abandoned

BACKGROUND OF THE INVENTION

1. Field of the Invention

The present invention relates generally to telecommunications systems and more particularly to an improved system for detecting, analyzing and preventing fraudulent use of telephone calling card numbers. The invention provides enhanced intelligence and efficiency in detecting fraudulent use of calling card numbers and may therefore assist a telephone company in better identifying and responding to calling card fraud.

2. Description of the Prior Art

Telephone fraud is a major area of abuse in the United States and throughout the world. Such fraud frequently involves the unauthorized or bogus use of telephone billing numbers, which have been assigned to customers and are associated with customer billing accounts. These numbers are typically imprinted or encoded on wallet sized cards, which are provided to customers to enable the customers to easily charge calls to their respective billing accounts. Consequently, these numbers are commonly referred to as telephone calling card numbers. As those of ordinary skill in the art will appreciate, however, the terms "calling card number," "billing number" and "bill number" are not restricted to card-based numbers but may refer more generally to any number used to bill or track telecommunications services.

The present invention may be used in the context of telecommunications networks generally, including, for example, the telephone network depicted and described in U.S. Pat. No. 5,602,906, issued on Feb. 11, 1997 in the name of Phelps, for a toll fraud detection system ("the Phelps patent.") The Phelps patent, which is assigned to the assignee of the present invention, is expressly incorporated herein by reference.

A typical telecommunications network includes telephone units interconnected to each other via central offices owned by local exchange carriers (LECs). These central offices are in turn interconnected to each other via network equipment owned by long distance service providers, or interexchange carriers (IXCs). The LEC provides local switches for receiving and forwarding calls placed to and from the interconnected telephone units as well as a tandem switch for passing calls between the local switches and the IXC. The IXC in turn commonly includes tandem switches designed to receive and forward calls to and from the LECs and from point to point throughout the IXC's long distance network.

In the United States, when a call is placed from a telephone unit, equipment in the LEC central office examines the originating and target phone numbers in order to determine the availability of the target phone and in order to properly handle and bill the call. For local calls, one or more switches in the central office routes the call from the originating phone to the target phone if the target phone is available.

For long distance calls made with a calling card, a user typically places an initial call to a calling card platform in order to input the user's card number and destination phone number. In many cases, this initial call is toll-free and may, for instance, take the form of a 1-800 (or 1-888) phone number. When the user dials a 1-800 number, LEC equipment first determines which interexchange carrier is designated to handle calls placed to that 1-800 number. This determination is typically made by passing a data message to a local signal transfer point (STP) in the LEC, which may query a database to find an associated IXC. In turn, after identifying the IXC, local equipment queries the long distance carrier to determine whether the carrier and its equipment is properly available to handle the call and whether the carrier agrees to handle the call. This query passes between signal transfer points in the form of a data message identifying information about the call such as the originating number, the target number, and the caller's billing number or calling card number.

IXC equipment examines this information to determine whether the call should be placed and, if so, which equipment or logic should handle the call. Upon receiving confirmation that the proper lines and switches are available along the call path from the originating phone through the target phone, the switches along the call path then complete the call.

In advanced telecommunications systems, interexchange carriers have seen a need to provide specialized services to meet diverse customer needs. In order to provide call handling services to meet these diverse needs, an interexchange carrier may include in each of its switches multiple "originating partitions" or "o-parts," which identify logic for handling calls or bill numbers of particular types. O-parts have typically been used to provide "virtual private networks" (VPNs), which define the IXC calling network available for specified bill types.

As an example, an IXC may provide multiple calling cards to a corporate customer for use by the corporation's employees. Calls made with these cards bear a bill type representing the corporate customer. Therefore, all of these calling cards may be associated with a specific o-part in the IXC's switches, and the o-part may identify logic such as a VPN in the IXC's switches for processing calls made with the cards. In this scenario, customers using these cards may or may not be aware that their calls are being handled in a special way by a virtual private network, depending on the design of the network.

As another example, interexchange carriers may sell long distance service to local exchange carriers or other companies throughout the country that act as apparent "long distance service providers" to callers. An LEC, for instance, may establish its "own" long distance service for its customers by arranging for an interexchange carrier to supply the service and providing its customers with calling cards. By arrangement with the IXC, these calling cards may be associated with an o-part in the IXC's switches that defines custom logic for processing calls made with the cards.

Fraudulent use of calling card numbers has evolved over the years and has unfortunately responded to telephone company detection efforts. More particularly, as interexchange carriers have developed new systems to detect and prevent fraud, criminals have developed new tactics for defeating those very detection schemes. In an early form, for instance, calling card fraud was detected by customers or long distance service providers who recognized the existence of unauthorized charges on customer billing statements. In response, interexchange carriers developed systems for monitoring records of completed calls, in search of aberrations or telltale signs of fraud. In turn, however, criminals developed methods of maximizing their fraudulent use of card numbers before the calls are completed. For example, organized groups of criminals have arranged to simultaneously or serially make multiple calls from phones across the country using a single stolen calling card number. As another example, criminals have used stolen card numbers to make expensive overseas calls that last many hours at a time and that evade detection until completed.

Calling card fraud has subjected interexchange carriers and others to financial loss, in part because the charges for such calls are frequently uncollectible. This is especially the case when unauthorized use is made of calling card numbers for placing international calls, because the interexchange carrier handling the call may have to transfer payments to the destination telephone company, even if the toll charge is uncollectible.

In addition, the existing methods and systems of fraud detection employed by interexchange carriers have been only partially successful. This is illustrated, for example, by the fact that some interexchange carriers will not place calls using a billing number to certain suspect countries. This scheme, of course, unfortunately prevents some legitimate billing number calls from going through to these countries.

Further, fraudulent use of calling card numbers issued by local exchange carriers or other "service providers" may not only affect the interexchange carrier that actually provides the service, but may also affect customer perception of the local company that issues the cards. In some circumstances, these companies may in turn suffer financial loss as a result of such calling card fraud.

A need therefore exists for a more efficient and intelligent system of calling card fraud detection.

SUMMARY OF THE INVENTION

In a principal aspect, the present invention comprises an improved system for detecting calling card fraud in a telecommunications network. Through its combined features, the present invention enables more intelligent and efficient detection of fraud and thereby facilitates enhanced, real-time fraud prevention and cost savings.

The present invention provides enhanced intelligence and efficiency through features that enable fraud analysis to be better customized and managed. Improved customization is achieved in part by employing existing information in the telecommunications network that identifies the service provider or provider of the bill number at issue and in part by providing a variable set of rules for responding to fraud determinations. Improved management of fraud analysis is provided in part by maintaining a case-subcase arrangement of fraud analysis information, by providing streamlined access to information in relevant cases, and by monitoring the ongoing fraud analysis process. Further, the invention beneficially provides for substantially real time analysis of not only completed calls but also call attempts, thus enabling interexchange carriers to minimize the presence and effect of calling card fraud.

The invention applies a set of fraud analysis routines to a call attempt in an effort to determine whether the call attempt involves fraudulent use of a bill number. In a preferred embodiment, the set of fraud analysis routines is selected based upon the identity of the bill type or service provider for the given bill number and may therefore be customized to suit the needs of the service provider. For this purpose, the invention conveniently obtains the identification of the bill type or service provider from the originating partitions contained in network switches.

When a user attempts to make a call using a bill number, regardless of whether the user's bill number is approved, the IXC generates a validation log message (VLM) that contains information about the call attempt and that beneficially includes an identification of the originating partition handling the call. Depending on the identity of the originating partition as specified by the VLM, the VLM is then directed to one of multiple fraud analysis platforms for processing. In this way, specific fraud analysis may be efficiently tailored to meet varying needs.

Once the VLM arrives at the designated fraud platform, the VLM is subjected to a first group of fraud rules designed to determine whether the call attempt is likely to involve fraudulent use of the bill number. For this purpose, pertinent factors representing telltale signs of fraud are developed through actual experience, and the rules are modified as necessary to incorporate these factors. Based on an application of these rules, if the call attempt is believed to be fraudulent, the system generates a fraud alert indicating the likelihood that the call is fraudulent, and the system passes the alert to a case manager for further analysis. The alert preferably consists of a database record that contains information about the call attempt, including the likelihood that the call attempt involves fraudulent use of the respective bill number.

In the preferred embodiment, the case manager builds fraud cases on a bill-number by bill-number basis in order to facilitate efficient analysis of fraud that may be occurring with respect to a given bill number. These cases preferably take the form of database records or "case records" that are each individually associated with one bill number. Each case record is in turn related to at least one subcase record that defines a fraud analysis of the bill number. When a new alert is generated in relation to a bill number as to which an open case exists, the case manager appends the alert to the currently active subcase, for analysis together with the other alerts in the subcase. In the event a case exists for the bill number but the case has already been resolved, the case manager establishes a new subcase related to the case and appends the alert to the new subcase. Still alternatively, if a case record for the bill number does not yet exist or is not available, then the case manager establishes both a new case and subcase, and the case manager appends the alert to the new subcase.

The present invention enables streamlined access to existing fraud cases by interconnecting both a memory and a database file to the case manager. The memory holds fraud cases that have been accumulated over a preceding time period, say the past three hours. The database file, in contrast, preferably holds fraud cases that have been accumulated over a longer period of time, say the past three months. This configuration beneficially enables quick access to relatively recent information in the memory while still maintaining access to older information as well in the database file.

Once the case manager establishes or modifies a case for an existing alert, the invention beneficially applies an additional set of rules to the case. Among these second level rules, the present invention automatically blocks subsequent use of the bill number if any alert associated with the pending case represents a likelihood of fraud greater than a specified level. In this regard, however, the invention advantageously provides exceptions to automatic blocking. The invention may, for instance, include a file of bill numbers designated to not be automatically blocked, notwithstanding the presence of the specified minimum likelihood of fraud After these additional rules have been applied to the pending case, case records are then passed to a queue for manual analysis by fraud researchers. Each fraud researcher is positioned at a fraud workstation, which conveniently provides the researcher with access to case and subcase information, customer information and assorted tools configured to facilitate an educated review of the case at issue. For instance, by selecting various menu items or icons on a workstation display, the researcher may filter incoming cases, view or retrieve desired cases, and view customer account information.

The researcher in turn conducts an analysis of the case and may easily refer to the subcases within the case. Upon resolution of the case, the fraud researcher may elect to block the bill number from subsequent use or may choose to close the case and leave the bill number active.

As call attempts and completed calls are analyzed by the fraud system of the present invention, an administrative process is employed to monitor the status of ongoing analysis and to check for malfunctions in the system. The administrative process obtains status information from components of the system and may, for instance, generate system-wide warnings when malfunctions are detected. In this way, the present invention achieves still greater precision and efficiency in detecting and preventing calling card fraud.

These as well as other advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF THE PREFERRED EMBODIMENTS

Figure 1:
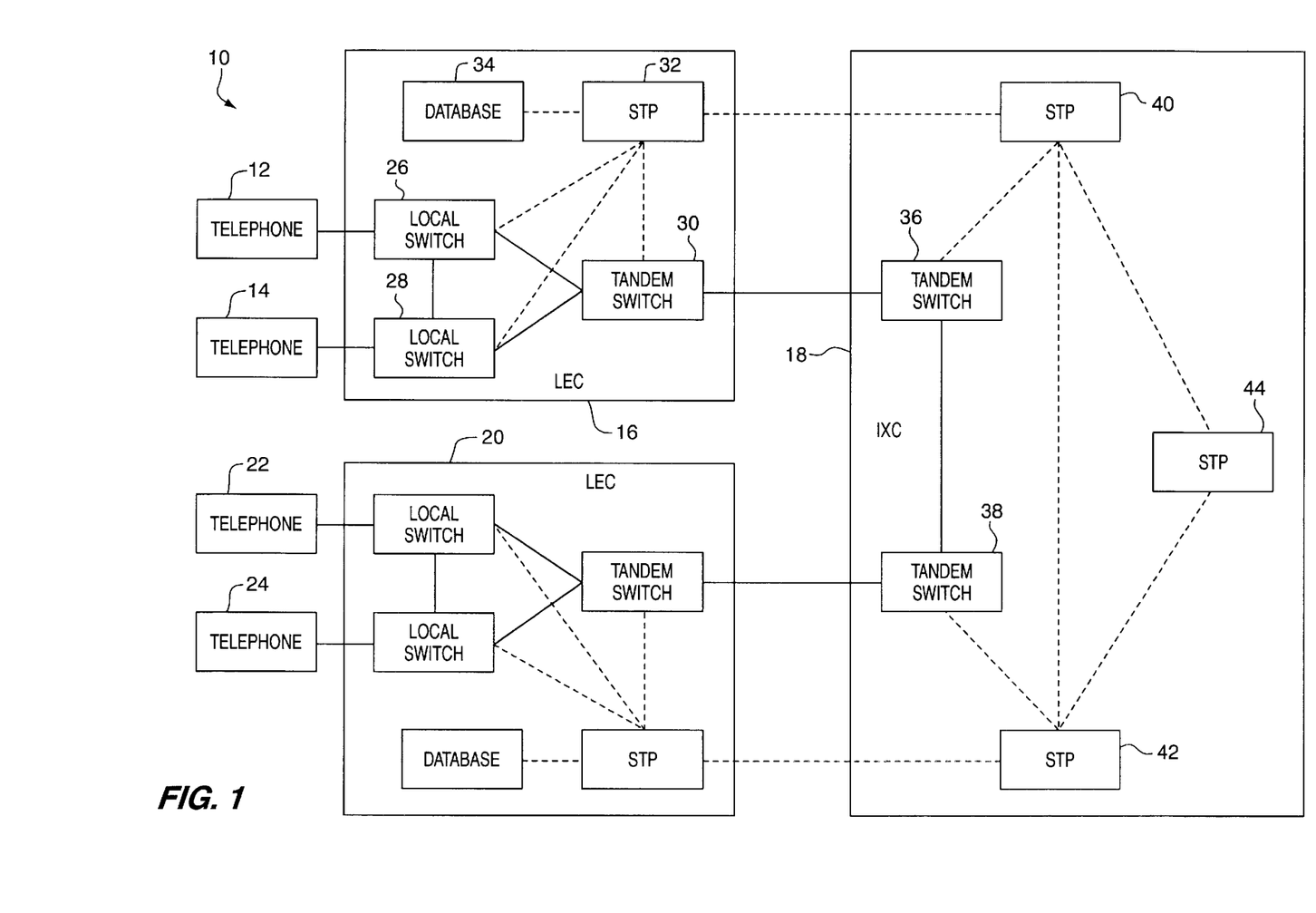
FIG. 1 is a block diagram of a telecommunications network that may include the improved method and apparatus of the present invention.

Referring to the drawings, FIG. 1 illustrates the arrangement of a telecommunications network 10 that may employ the fraud detection and prevention system of the present invention. The arrangement shown is presented for purposes of illustration only and is not intended to limit the context of the present invention.

Telecommunications network 10 generally includes originating telephone units 12, 14, an originating local exchange carrier (LEC) 16, a long distance carrier or interexchange carrier (IXC) 18, a terminating local exchange carrier (LEC) 20, and terminating telephone units 22,24. LEC 16 is responsible for routing local calls between telephone units 12 and 14. Additionally, LEC includes local switches 26, 28, tandem switch 30, signal transfer point (STP) 32 and database 34. IXC 18 includes remotely positioned tandem switches 36, 38 that are respectively interconnected to signal transfer points 40, 42. Additionally, STPs 40, 42 are both interconnected to a signal control point (SCP) 44, although those skilled in the art will recognize that multiple redundant SCPs may be provided throughout IXC 18.

When a user places a calling card call from telephone unit 12, for instance, the user may dial a toll-free phone number (such as a 1-800 or 1-888 number) that is associated with a calling card platform in the telecommunications network. In turn, local switch 26 launches a query to STP 32, which determines by reference to database 34 the identity of the long distance carrier designated to handle the toll-free phone number. The information contained in database 34 is typically compiled in advance by arrangement between the LEC and various IXCs.

Once the designated IXC is identified, LEC equipment routes the call to the IXC switch 36 for processing by an associated calling card platform. For this purpose, switch 36 contains or constitutes the calling card platform. However, those of ordinary skill in the art will appreciate that the platform may alternatively be external to the switch, in which case switch 36 would route the call to the external platform for processing.

The calling card platform may collect a variety of information about the attempted call, including the originating phone number (ANI), the destination number, the bill number, and the bill type (such as an identification of the service provider or the entity that issued the billing number). Typically, the platform identifies an originating partition (o-part) associated with the incoming calling card call and accordingly determines the associated bill type. In many cases, this o-part will in turn identify the logic used to process the call. The platform then plays a message prompting the caller to dial or otherwise input the caller's card number and desired destination phone number. Additionally, the platform obtains other information, such as the originating ANI and originating phone type, through one or more data messages passed from local STP 32 to network STP 40. These data messages are typically transmitted as out-of-band signals in relation to voice-band communications signals and may be carried by a separate line or in a separate data channel.

Upon receiving the necessary information, switch 36 queries SCP 44 in order to determine whether the caller's bill number is valid. SCP 44, in response, returns a validation message to switch 36 indicating either that the bill number is approved or that the bill number is not approved. In addition, through a series of data messages, switch 36 communicates with remote switch 38 and LEC 20 to ensure the availability of connections for handling the call. In the event the bill number is approved and the lines are available to the terminating phone, a series of data messages pass through the signal transfer points along the entire call path notifying the switches to open the connection between the originating and terminating phones.

Figure 2:
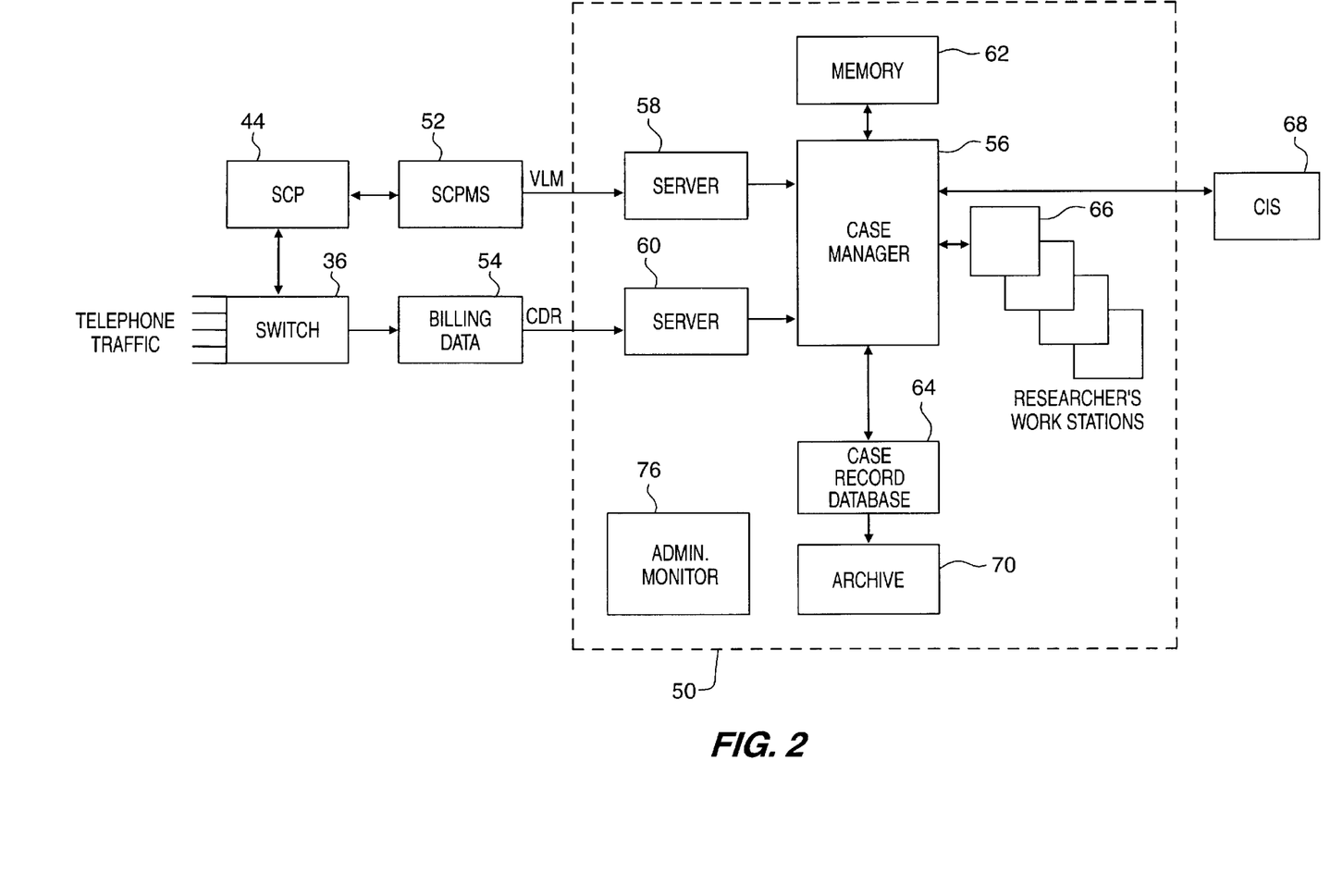
FIG. 2 is a block diagram illustrating the flow of information in a preferred embodiment of the present invention.

Referring now to FIG. 2, the present invention is shown as a fraud system 50, which is interconnected to a service control point management system (SCPMS) 52 and billing server 54. SCPMS 52 is in turn interconnected to SCP 44 and is employed when switch 36 (via STP 40) seeks validation of a caller's billing number as discussed above. Billing server 54 is further interconnected to switch 36 and receives information such as the time, duration and cost of the call at issue for use in billing the call.

Fraud system 50 preferably includes one or more software routines or processes executed by one or more processors. In this regard, the present invention is not limited to a structure consisting multiple discrete computers performing separate software routines. Rather, as those of ordinary skill in the art will appreciate, much of fraud system 50 may be embodied in a single set of routines or threads executed by a single processor or in various combinations of processors and software instructions. Therefore, where reference is made to one processor or one routine, the present invention may alternatively employ multiple processors or multiple routines. Similarly, where reference is made to multiple processors or multiple routines, the present invention may alternatively employ to a single processor or a single routine.

In the preferred embodiment, fraud system 50 includes a case manager processor operating a case manager process 56. The case manager processor is in turn interconnected to one or more servers 58, 60, a memory 62, a database server operating a case record database 64, and fraud analysis workstations 66. Additionally, the case manager processor is interconnected to a customer service information (CIS) system 68, which is typically located outside the fraud system 50. Fraud system 50 also preferably includes an archive 70 in the form of optical disks for storing historical fraud analysis records. Still further, fraud system 50 is associated with an administrative monitor 76, which preferably monitors all processes running in the system and may be either internal or external to fraud system 50.

In one embodiment, for instance, the case manager processor, the database processor and servers 58, 60 each take the form of Sun 1000E servers. Additionally, fraud analysis workstations 66 may take the form of Sun Spark 5.4 computers, and CIS 68 may take the form of a Sun Spark 20 server.

The fraud system of the present invention interfaces with switch call information and with customer information in order to build and analyze fraud cases. Switch call information concerns attempted and completed calls and takes the form of call related messages such as validation log messages (VLMs) and call data records (CDRs). Customer information, which is maintained by CIS 68, concerns customer accounts and may include, for instance, invoices, payment history and notes regarding customer disputes.

Figure 3:
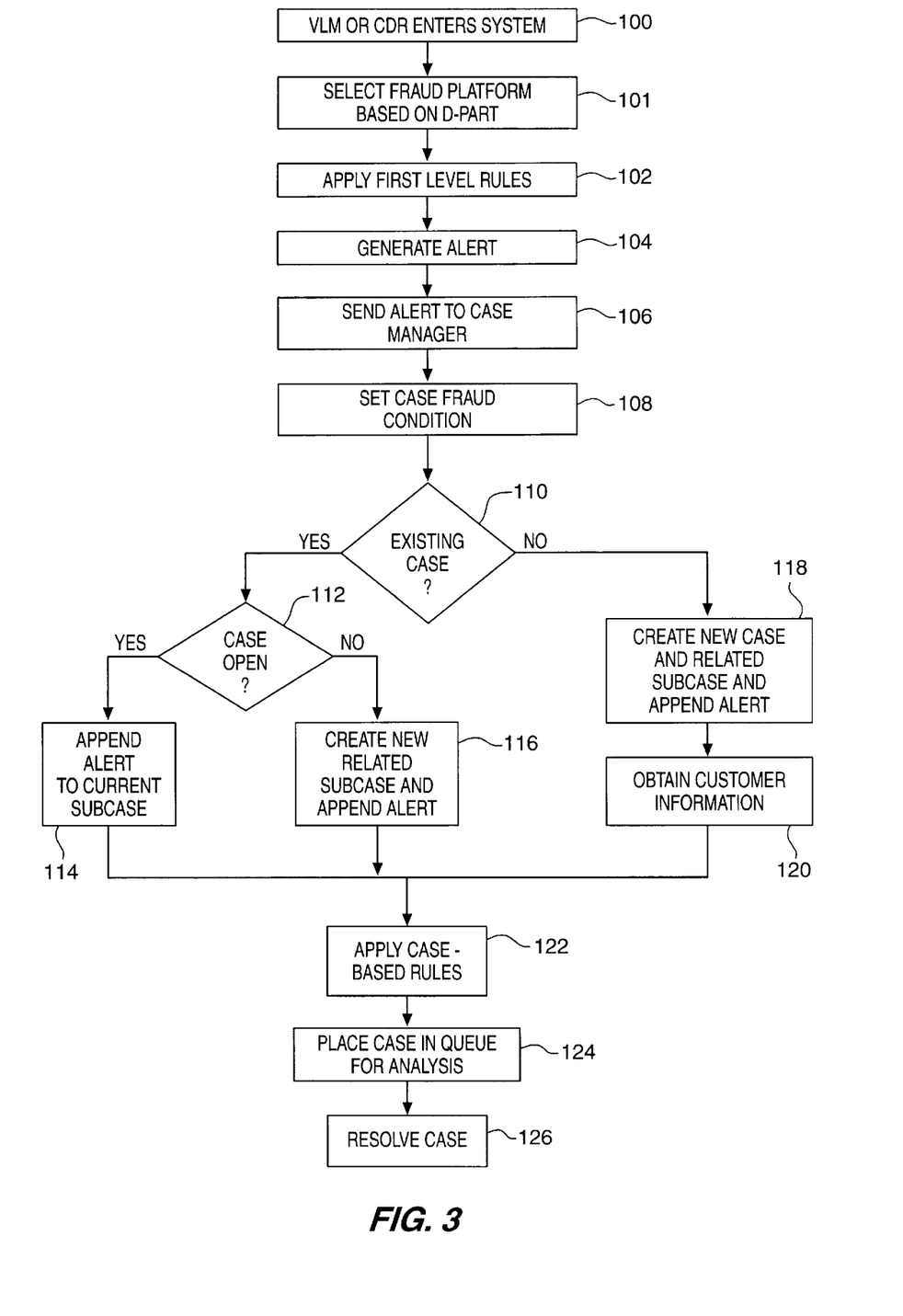
FIG. 3 is a flow chart illustrating the fraud detection and prevention process in a preferred embodiment of the present invention.

FIG. 3 illustrates the process flow in a preferred embodiment of the present invention. Referring to FIG. 3, at step 100, VLMs and CDRs are independently provided to fraud system 50. VLMs are generated by the IXC for purposes of fraud analysis at the time a user attempts to place a calling card call, regardless of whether the user's bill number is approved. More particularly, as discussed above, SCP 44 provides a card validation to switch 36 (via STP 40). At the same time, SCP 44 provides a record of the call attempt to SCPMS 52. SCPMS 52 in turn generates a VLM and passes the VLM to fraud system 50. Call data records (CDRs), on the other hand, are normally generated at the conclusion of a successfully placed call and are typically used by the IXC to compile billing and other customer records.

In the preferred embodiment, the VLM may take any of a variety of forms but should include certain minimum information about the attempted call, such as the originating number, terminating number, calling card number, and originating partition associated with the call. The VLM may be formatted as a database record, for instance, that includes the following fields defining the call attempt:

| Field | Length | Type |
| --- | --- | --- |
| Card Type | 1 | ASCII |
| Calling Card Number | 12 | BCD |
| Orig. Point Code | 3 | Binary |
| Card Status (for call) | 1 | BCD |
| Called Number | 8 | BCD |

-continued

| Field | Length | Type |
| --- | --- | --- |
| Nature of Number | 1 | BCD |
| Calling Number | 8 | BCD |
| Nature of Number | 1 | BCD |
| Info Digits | 1 | BCD |
| Service Class | 1 | BCD |
| Originating Partition | 2 | BCD |
| Class of Service | 2 | Binary |
| Filler | 9 | Binary |

To a limited extent, a CDR will contain the same information as the VLM for a given call. This information may include, for instance, the originating and terminating numbers and the calling card or account number being used. In addition, a CDR typically includes billing information such as the start and stop times of the call and the call duration. Like the VLM, the CDR may be formatted as a database record but includes fields defining the completed call. Upon arrival at the fraud system 50, CDRs may be filtered in order to eliminate CDRs associated with calls made without calling cards, such as 1-plus calls.

By providing a VLM to fraud system 50 when a calling card call is attempted, the fraud system is able to quickly respond to fraudulent calls before the calls are completed and, in many cases, while the resulting call is in progress. Moreover, the present invention beneficially incorporates in the VLM an identification of the originating partition or o-part associated with the given call. As discussed above, the o-part identifies logic in the IXC switch 36 that processes calls of specified bill types and may serve, for example, to identify the calling card service provider, or customer, for whom the IXC supplies long distance communications service billed to the card number at issue. By incorporating an identification of the o-part in each VLM, the present invention is thus able to readily tailor fraud analysis to the needs of various service providers.

More particularly, fraud system 50 may be configured as multiple fraud platforms for conducting specialized fraud processing, in order to serve varying needs. Independent platforms may, for instance, provide different levels of fraud detection. One platform may provide the most complete available fraud analysis on call attempts and completed calls, while another platform may provide less stringent fraud analysis. In this way, an IXC may, for instance, simultaneously supply different fraud analysis services, or routines, for different bill numbers or for different bill types. In the preferred embodiment, the present invention accomplishes this by conveniently referring to the o-parts identified in incoming VLMs and directing the VLMs to the fraud platform that is associated with the respective o-part. In this regard, while FIG. 2 illustrates a single set of components designated as fraud system 50, the arrangement of fraud platforms according to the present invention may vary. Each platform, for example, may separately include its own case manager, memory, case record database, archive and fraud workstations. Alternatively, multiple fraud platforms may exist in the form of separate software routines or processes run on a single set of components as depicted in FIG. 2.

Upon arrival at the fraud system 50, a VLM is preferably received by a computer system such as server 58, which examines the o-part information included in the VLM and sends the VLM to the fraud platform associated with the given o-part, as indicated at step 101 in FIG. 3. For this purpose, a processor in server 58 may, for instance, refer to a table or other file that indicates which fraud platforms are associated with which o-parts.

As shown at step 102 in FIG. 3, once a VLM or CDR arrives at fraud system 50, the fraud system runs a set of first level rules on the VLM or CDR in order to determine whether the underlying call attempt or call is likely to involve fraudulent use of a bill number. These rules or "fraud indicia" preferably take the form of tables or files of predicates that are loaded into a computer system such as server 58 or server 60. By storing these rules in this form rather than encoding the predicates in software, the predicates may conveniently be configured or modified as new fraud scenarios arise and as empirical experience dictates.

The first level rules may generally fall into several categories, including (i) those related to velocity or frequency of call placement, (ii) those related to suspect originating or terminating locations or ANIs, (iii) those related to the time duration of calls, (iv) those related to multiple simultaneous use of a bill number, and (v) those related to repeated abuse for a given originating and terminating number. However, those skilled in the art will appreciate that numerous other fraud indicia may be known or may be developed in the future and employed within the scope of the present invention. In addition, it should be appreciated that different sets of indicia may beneficially be applied to VLMs and CDRs in view of the different timing and information associated with these input records.

In the event the VLM or CDR at issue satisfies predetermined fraud indicia, the respective server (58 or 60, for instance) generates an alert, as shown at step 104 in FIG. 3. In the preferred embodiment, this alert is generated by a software routine running on the server and takes the form of a database record referred to as an alert record. The alert record preferably contains fields of data including those carried by the VLM or CDR as well as an indication of the level of likelihood that the underlying calling card use is fraudulent. This level of likelihood may be viewed as a fraud condition of the alert.

In the preferred embodiment, the fraud condition of an alert is selected from a set of available fraud conditions that are contained in a table or file stored in a memory or other medium accessible by the server. Because the fraud conditions themselves are preferably not written into computer code, the set of available conditions may be modified as necessary without the need to rewrite software. In the preferred embodiment, the available fraud conditions and hence the available alerts may be designated by color codes representing degrees of significance, such as yellow, orange, red and double-red. In this scheme, for instance, red reflects suspect use of a bill number, and double-red reflects highly suspect use of a bill number.

To enhance the utility of fraud system 50, the set of available fraud conditions may be customized to suit varying needs. To do so, the server receiving the VLM or CDR may be set to filter the set of available conditions based on a number of factors. These factors, like the fraud conditions themselves, are preferably stored in an accessible table or file for convenient reference and modification as necessary.

As an example, the present invention may conveniently provide time-based filters, which modify or restrict the set of available alerts depending on the time of day, the day of the week or the date. It is therefore possible, for instance, to allow special alerts on holidays or to preclude certain alerts at various times of day. As another example, the invention may filter the available alerts based on the identity of the calling card number or customer account at issue. In this way, for instance, a customer may arrange with the IXC to impose less restrictive fraud analysis by eliminating the availability of double-red alerts for calls placed with the customer's card number.

Once an alert has been generated, the respective server forwards the alert record to case manager 56, as indicated at step 106 in FIG. 3. In the preferred embodiment, case manager 56 consists of a software process running on a server, or processor. Case manager 56 is responsible for building and modifying cases based on alerts and for forwarding designated cases to a queue for manual fraud analysis.

The present invention beneficially organizes fraud analysis of bill number use into a case-subcase configuration. In this configuration, a case represents fraud analysis related to a given bill number, and each case "contains" one or more subcases defining instances of fraud analysis and including, for instance, any pertinent notes regarding fraud analysis of the case. Cases and subcases preferably take the form of database records bearing a one-to-many database relationship with each other. Subcases, in turn, bear a one-to-many database relationship with alerts involving use of the given bill number. Additionally, cases are either in an open state or a closed state, which may be indicated for instance by a flag or field in the case record. A case is open when fraud analysis is pending and not yet resolved in a related subcase. On the other hand, a case is closed once analysis in the related subcase has been resolved.

In the preferred embodiment, case manager 56 sets a fraud condition of the case to the highest fraud condition of any alert related to that case, as shown at step 108 in FIG. 3. This fraud condition may, for instance, be indicated by a field in the case record. For instance, if a case record includes a subcase that involves (or is related to) both an orange alert and a double-red alert, case manager 56 would preferably set the fraud condition of the case to double-red.

The case-subcase configuration of the present invention improves over existing systems that serially record bill number use or that generate and separately analyze alerts for each instance of supposed bill number fraud. As those skilled in the art will appreciate, each new analysis of bill number use in existing fraud detection systems typically disregards prior fraud analysis of the bill number or requires an analyst to reconstruct a history of use from numerous independent records or fields. The case-subcase arrangement of the present invention, in contrast, provides flexibility and quicker reference to related data and thereby facilitates more prompt and efficient fraud analysis.

The present invention further provides streamlined access to case records and their related subcases and alerts. To this end, in the preferred embodiment, case records are stored in memory 62 for a specified time period such as three hours and in case record database 64 for another time period such as three months. It will be appreciated, of course, that these time periods of storage in memory 62 and in case record database 64 may or may not coincide with each other and may vary depending on hardware or other constraints. Further, after a specified time period, case records may be archived on optical disks 70 or another suitable storage medium.

As those of ordinary skill in the art will understand, information stored in memory is typically much more volatile and easily accessible than information stored in a database file. Therefore, by storing more recent case records in memory 62 and older case records in case record database 64, case manager 56 may more readily access case records associated with recent fraud analyses but may still access older case records as well. As a result, the present invention enables an interexchange carrier to more efficiently handle frequent fraud scenarios involving the same bill number, because recent cases related to the bill number will be more readily accessible.

When case manager 56 receives a new alert, the case manager applies a software routine to establish a case, which may entail modifying an existing case or establishing a new case. To this end, the case manager first searches memory 62 and case record database 64 for an existing case record related to the bill number at issue, as indicated at step 110 in FIG. 3. In particular, case manager 56 preferably first searches memory 62, and, if it does not find an existing case record for the bill number in the memory, it launches a query for an existing case record in case record database 64. Alternatively, case manager 56 may simultaneously search both memory 62 and case record database 64 for an existing record.

In the event case manager 56 finds an existing case record for the bill number at issue, the case manager checks whether the case record is open or closed, as shown at step 112. If the case record is open, by definition, a related subcase is open as well for analysis of an existing alert regarding use of the bill number. Therefore, at step 114, case manager 56 then appends the new alert record to the open subcase record, preferably by establishing a database relationship between the two records. In this way, the existing open subcase will "contain" information about both the existing and new alerts and will thereby facilitate efficient and effective fraud analysis.

If, on the other hand, the existing case record is closed, by definition, fraud analysis in a related subcase has been concluded, or resolved. Therefore, at step 116, case manager 56 then creates a new subcase record, relates the new subcase record by a database relationship to the case record and appends the new alert to the new subcase as discussed above.

In the event case manager 56 does not find an existing case record corresponding to the bill number, case manager 56 creates a new case record for the bill number and a new subcase record related to the case record. As shown at step 118, case manager 56 then appends the new alert to the new subcase as discussed above. In addition, at step 120, case manager 56 preferably obtains pertinent customer information from CIS 68 and includes, or appends, this information in the case record to aid in subsequent fraud analysis of the customer's bill number. In the preferred embodiment, case manager 56 does not include customer notes from CIS 68 at this time, as customer note information tends to be cumbersome and typically unnecessary until a case record is passed to a researcher for manual fraud analysis.

Once case manager 56 has built a case corresponding to the bill number at issue, the case manager may store the current alert in an appropriate table in the case record database file. From there, the alert may subsequently be referenced for purposes of fraud analysis.

In the preferred embodiment of the present invention, case manager 56 next applies a series of additional fraud analysis rules to the case, as shown at step 122. These "case based rules" may result in positive or negative adjustments of the case fraud condition or other adjustments to the case depending on a variety of factors. Like the fraud indicia discussed above, these rules may beneficially be stored in attribute tables or other files for easy reference and modification as deemed necessary. These additional rules may include, for instance, identification of cases to be automatically blocked, identification of cases that should not be automatically blocked, reduction of the fraud condition on sensitive cases, various account-level rules, and other fraud analysis rules now known or later developed.

For instance, the present invention includes an advanced system for responding to alerts higher than a predetermined level. According to this system, when the fraud condition of a case is at least a predetermined level, case manager 56 will, in general, automatically block or "auto-stun" use of the underlying bill number. In turn, case manager 56 notifies the network SCPMS 52 that the card has been blocked and updates the status of the bill number in CIS 68 for subsequent reference by customer service personnel. Additionally, case manager 56 preferably then places the case in a "call back" queue for manual analysis by fraud researchers as will be described below.

In order to further facilitate enhanced customization, however, the present invention additionally employs a "no-autostun" file as well. The no-autostun file beneficially lists bill numbers that should not be auto-stunned and therefore provides a useful exception to automatic blocking. Information in the no-autostun file may be compiled, for instance, upon customer request. Further, added security may be provided by setting expiration dates for all data maintained in the no-autostun file and accordingly removing bill numbers from the file after specified periods of time. In the preferred embodiment, if a bill number at issue is listed in the no-autostun file, but the case would normally be auto-stunned, the case is passed directly to a researcher queue for analysis as described below.

Case manager 56 may also apply one or more account-level rules or bill-number based rules to the case at issue. Account-level rules are a set of rules applicable to a given customer account. For instance, when an IXC has issued a set of calling cards to a corporate client, the corporation may wish to prevent those card numbers from being auto-stunned by the IXC's fraud prevention system. For this purpose, an account level rule may be employed to provide exceptions to automatic blocking provisions for all card numbers within the customer's account rather than on a bill-number by bill-number basis as with the no-autostun file.

Bill number rules, in contrast, are a set of rules keyed to specific bill numbers. For instance, a customer may arrange with the IXC to always reduce the fraud condition of any case associated with the customer's bill number to, say, yellow. Bill number rules such as this may be stored in attribute tables and may be conveniently modified as necessary or referenced and applied by the case manager.

Still further, case manager 56 may be set to automatically reduce or "demote" the fraud condition of cases that are considered to be sensitive. Sensitive cases may be identified by associated bill numbers listed in a sensitive file. Rather than proceeding with standard fraud analysis of sensitive cases, case manager 56 may reduce the fraud condition of those cases to a lowest possible level, such as white, and close the cases.

As those skilled in the art will appreciate, case manager 56 may apply still other rules that do not fall into the above categories. For instance, if a user travels from home and uses a calling card to call a suspect city, fraud system 50 may generate an alert. Case manager 56, however, may apply a rule to the case that refers to the user's billing invoice as maintained in the CIS records. If, for example, the user's latest bill indicated that the user made and paid for five calls to the same suspect city from the user's home, then case manager 56 may determine that the alert is erroneous, and case manager 56 may close the case without further analysis.

Once case manager 56 completes its application of case-based rules, at step 124, the case manager preferably places each case into one of several condition queues to be worked by skilled fraud researchers at workstations 66. To do so, the case manager may conveniently pass to the queue a record that defines basic customer information (such as the bill number and the associated case fraud condition) and that defines the current subcase (such as the subcase fraud condition and a description of the alert that gave rise to the subcase). As will be described below, the researcher may subsequently select and view other information related to the case, such as previous subcases and other customer information. In an alternative embodiment, however, the invention may initially pass to the queue a record of the entire case, including all related subcases and pertinent customer information.

The process of passing a record to a queue may include passing all or part of the actual record and/or passing a pointer to the record. In the preferred embodiment, the case manager passes a complete case record to the queue by converting all of the pertinent information into a concatenated ASCII character string and transmitting the string via a local area network to a workstation 66. Upon receipt, the workstation parses the character string into respective information (such as discrete subcases and customer information) for manipulation and viewing by the researcher.

In the preferred embodiment, only cases that bear at least a specified minimum fraud condition, or analysis level, are passed on for manual analysis. For this purpose, as an example, separate condition queues may be provided for red cases and double-red cases. Additionally, cases are preferably provided to the researchers on a priority basis keyed to fraud condition and chronology.

Individual researchers may also be supplied with their own queues of assigned or selected cases for analysis. In this regard, in order foster expertise in particular areas and to thereby further enhance the efficiency of fraud system 50, researchers' queues may be filtered based on various factors, as will be described below. As an example, a researcher may be limited to analyzing cases regarding calls that originated from pay phones or from phones in prisons. Alternatively, a researcher may be limited to receive only those cases that relate to calls placed to designated suspect countries.

Figure 4:
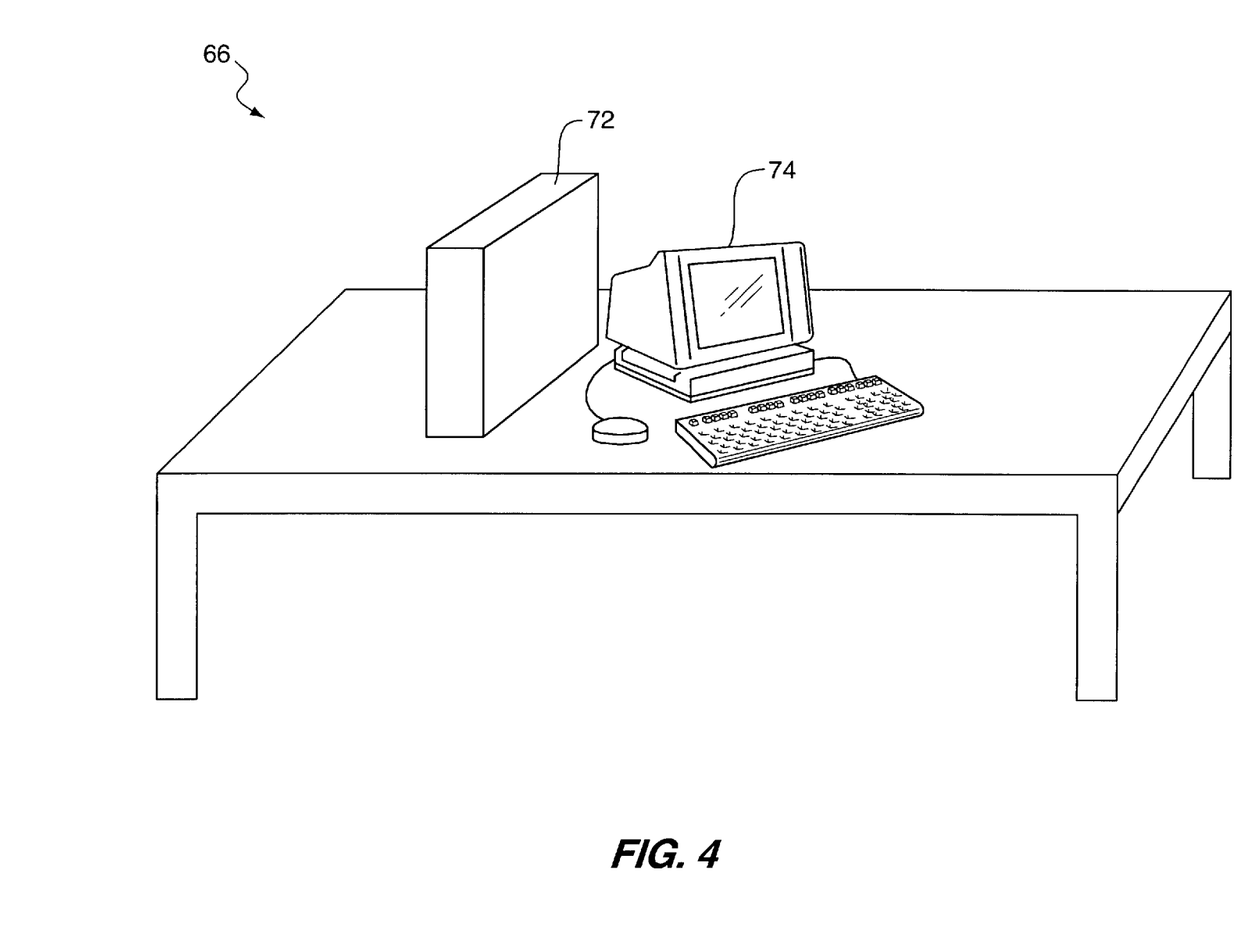
FIG. 4 is an illustration of a fraud workstation employed in a preferred embodiment of the present invention.

In the preferred embodiment, workstations 66 provide a useful set of tools to enable researchers to effectively and efficiently conduct fraud analysis. As depicted in FIG. 4, each workstation preferably includes a computer 72 and a monitor 74. Computer 72 is interconnected to the case manager 56 as well as to the customer information system or customer information database 68. Computer 72 may thereby receive case related information (such as subcase data and basic customer information) from the case manager and customer related information (such as customer invoice or dispute information) from CIS 68.

A researcher may selectively view on monitor 74 all of the information associated with the case at issue, including prior subcases related to the current subcase, as well as alert information associated with the current subcase or related subcases. For this purpose, monitor 74 may conveniently display multiple windows (discrete display sections) of useful information simultaneously for quick reference by the researcher who is attempting to resolve the case. As an example, a first section on the monitor may display basic customer information, such as the bill number and the customer name and address. A second section on the monitor may simultaneously display basic case information, such as the case fraud condition and a description of the current subcase (including, for instance, the time the underlying alert arose and the basis for the alert). A third section on the monitor may simultaneously display other pertinent information, such as a chronology of previous subcases related to the case at issue, or additional, more detailed customer information. Still another section may simultaneously display a chronology of actions taken by the researcher, for instance, with respect to the case currently at issue.

Workstation 66 displays a number of indicia that enable a researcher to view pertinent information and modify case records as necessary. In the preferred embodiment, these indicia individually take the form of a menu item or an icon. The researcher may select one or more of these indicia with a mouse or other pointing device in order to invoke one or more desired tools. Of course, those of ordinary skill in the art will appreciate that numerous other mechanisms may now exist or may later be developed to enable a fraud researcher to selectively view one or more sections of pertinent information at workstation 66 within the scope of the present invention.

As an example, workstation 66 may include a menu item or icon designated as a case filter or as filter indicia. When the researcher selects this item or icon, a window may open on monitor 74 prompting the researcher to provide properties defining the scope of cases for the researcher's queue. Through this property window, the researcher may specify, for instance, that the researcher's workstation will receive only those cases that have certain fraud conditions or that are associated with calls having certain originating or terminating ANIs or calls that originated from certain types of phones. Additionally, or as part of this property window, workstation 66 may include a menu item or icon that, when selected, will cause workstation 66 to launch a query with case manager 56 to determine and display a count of existing cases that satisfy the specified filter properties. In this way, the researcher may conveniently determine whether the specified filter properties are likely to produce a case load of reasonable scope.

As another example, workstation 66 may include previous subcase indicia. When the researcher selects such indicia, workstation 66 displays in a section of monitor 74 information that defines previous subcases related to the case at issue. This information may appear, for instance, in the third section described above and may take the form of a descriptive list of previous subcases. By enabling the researcher to view a streamlined chronology of the previous subcases related to the current case, the present invention additionally facilitates quick and efficient fraud analysis.

As still another example, each workstation 66 enables a researcher to view not only the basic customer information that is included as part of the case at issue but also all customer information maintained in CIS 68. For this purpose, in the preferred embodiment, a link to CIS 68 is established by IBM 3270 emulation software interconnected to a Legacy customer database in CIS 68.

By selecting designated customer information indicia displayed on monitor 74, a researcher may cause workstation 66 display in one or more windows on monitor 74 specified customer information from CIS 68. One such window may, for instance, provide basic customer information (such as the customer's bill number, name, address and phone number), while other windows may provide customer invoice or payment information or notes regarding customer disputes. Some or all of this customer information may, for instance, appear in a designated section on monitor 74, such as the third section discussed above.

By thus integrating full access to customer information directly on the monitor 74 of fraud workstation 66, the present invention beneficially avoids the need to provide researchers with one monitor dedicated to fraud analysis and another monitor dedicated to CIS access. Instead, the researcher may conveniently view all necessary information on a single monitor. In this way, the present invention allows the researchers to more accurately and quickly complete their analyses.

As a further convenience and aid to fraud analysis, when case manager 56 receives an alert and establishes a subcase that is associated with a case currently being analyzed at a workstation 66, case manager notifies the workstation of the new alert. In the preferred embodiment, case manager 56 does so by transmitting to the workstation a message indicating the existence of the new alert. The message appears on the workstation monitor 74, for instance, in a status section at the base of the monitor.

Workstation 66 in turn preferably includes refresh indicia displayed on monitor 74. When a researcher receives notice of a new alert related to the case currently at issue, the researcher may select the refresh indicia. In response, workstation 66 obtains from case manager 56 an updated case record or at least that portion of the case record defining the new, related subcase.

In an alternative embodiment, it will be appreciated that a case record currently at issue at workstation 66 may be directly linked to the case record data stored in memory 62 (or in case record database file 64). In this way, whenever case manager 56 revises the case record, the revisions will automatically appear at workstation 66 for consideration by the fraud researcher. In this alternative embodiment, the researcher may or may not be required to take any action in order to refresh the current case.

Still further, workstation 66 provides a researcher with the ability to selectively view another case or to switch to a new current case. For this purpose, each workstation 66 may provide case selection indicia on monitor 74. The case selection indicia may, for instance, take the form of a menu item providing the researcher with several options. As an example, the researcher may opt to retrieve a next case from the queue. In this instance, workstation 66 would preferably retrieve the next case that satisfies any filter properties previously established for the workstation or for the researcher.

As another example, the researcher may opt to view in read-only form a case that is based on specified parameters. For this purpose, when the researcher selects the associated case-selection indicia on monitor 74, workstation 66 prompts the researcher to identify a desired case, for instance, by bill number or other unique information. In response, workstation 66 queries case manager 56 for the requested case. If the requested case exists, case manager 56 provides the case record to the requesting workstation in read-only form. In a related aspect of the present invention, a researcher or supervisor may selectively view in read-only form (in a discrete window on monitor 74, for instance) a fraud analysis session that is pending at another workstation. This feature may be useful for a number of purposes, including training researchers and compiling reports that may assist in the revision of rules applied by fraud system 50.

As still another example, the researcher may opt to retrieve a new current case based on specified parameters such as a bill number, a case ID or other information unique to a case record. In the preferred embodiment, when the researcher selects the associated case-selection indicia on monitor 74, workstation 66 prompts the researcher to enter one or more search parameters. Based on this parameter or parameters, workstation 66 queries case manager 56 for the requested case.

Case manager 56 in turn searches memory 62 and/or database 64 as described above. If the case manager locates the requested case, the case manager passes the case to the requesting workstation. In this regard, if, the requested case is currently being analyzed at another workstation, the case manager may provide the case to the requesting workstation in read-only form as noted above. Further, if the researcher has specified a bill number and case manager 56 does not find a corresponding case, then case manager 56 preferably establishes a new case corresponding to the bill number, assigns a low fraud condition (such as yellow) to the case and passes the case to the requesting workstation. This feature beneficially enables a researcher to form a new case for analysis when necessary.

As yet another example, the researcher may opt to retrieve a case that has been held in a "call back" queue. In the preferred embodiment, a call back queue serves to hold cases that require further attention by a researcher. As described above, for instance, fraud system 50 sends autostunned cases to the call back queue for manual analysis by a researcher. Additionally, a researcher may elect to send a case to the call back queue if, for instance, the researcher is unable to resolve the case. In any event, the researcher may retrieve a case that was set for call back by selecting associated case-selection indicia displayed on monitor 74. Workstation 66 in turn retrieves a next case (or the selected case) from the call back queue.

In a related feature, as discussed above, fraud system 50 preferably includes a no-autostun file, which includes a compilation of bill numbers designated to not be automatically blocked even if the fraud condition of an associated case is higher than a predetermined level. Workstation 66 conveniently enables an authorized fraud researcher to view and/or modify the contents of this no-autostun file. For this purpose, workstation 66 may include no-autostun modification indicia displayed on monitor 74. When the researcher selects such indicia, workstation 66 displays on monitor 74 information associated with the no-autostun file and prompts the researcher to add, delete or query the file. The researcher may then, for instance, add a bill number to the no-autostun file and/or may modify expiration dates associated with entries in the no-autostun file.

Still further, workstation 66 advantageously enables an authorized fraud researcher to deactivate part or all of a customer account associated with a specified bill number. In this regard, certain bill numbers or customer accounts may be slated for deactivation based on specified fraud scenarios. Workstation 66 may therefore display deactivation indicia on monitor 74. By selecting such indicia, a researcher may deactivate the specified account temporarily or permanently in order to avoid further fraudulent activity or use of the account.

Through the use of tools including those described above, a fraud researcher studies the case presented at fraud workstation 66. Based on the researcher's analysis, the researcher may elect to either block the underlying bill number, pause the analysis, refer the case to another researcher or close the case, as indicated generally at step 126 in FIG. 3. If the researcher chooses to block the bill number, fraud system 50 responds in substantially the same way as if case manager 56 had auto-stunned the bill number. Namely, the system notifies the network SCPMS 52 that the number is blocked and updates the status in CIS 68 accordingly. If the researcher chooses to pause the analysis, the case remains in the researcher's queue or passes to the call back queue and awaits further action. If the researcher chooses to refer the case to another researcher, the system places the case in an appropriate condition queue to await analysis by another researcher. Alternatively, if the researcher chooses to close the case, the researcher preferably places a note in CIS 68 indicating that an active fraud analysis has been closed in relation to the bill number.

Figure 5:
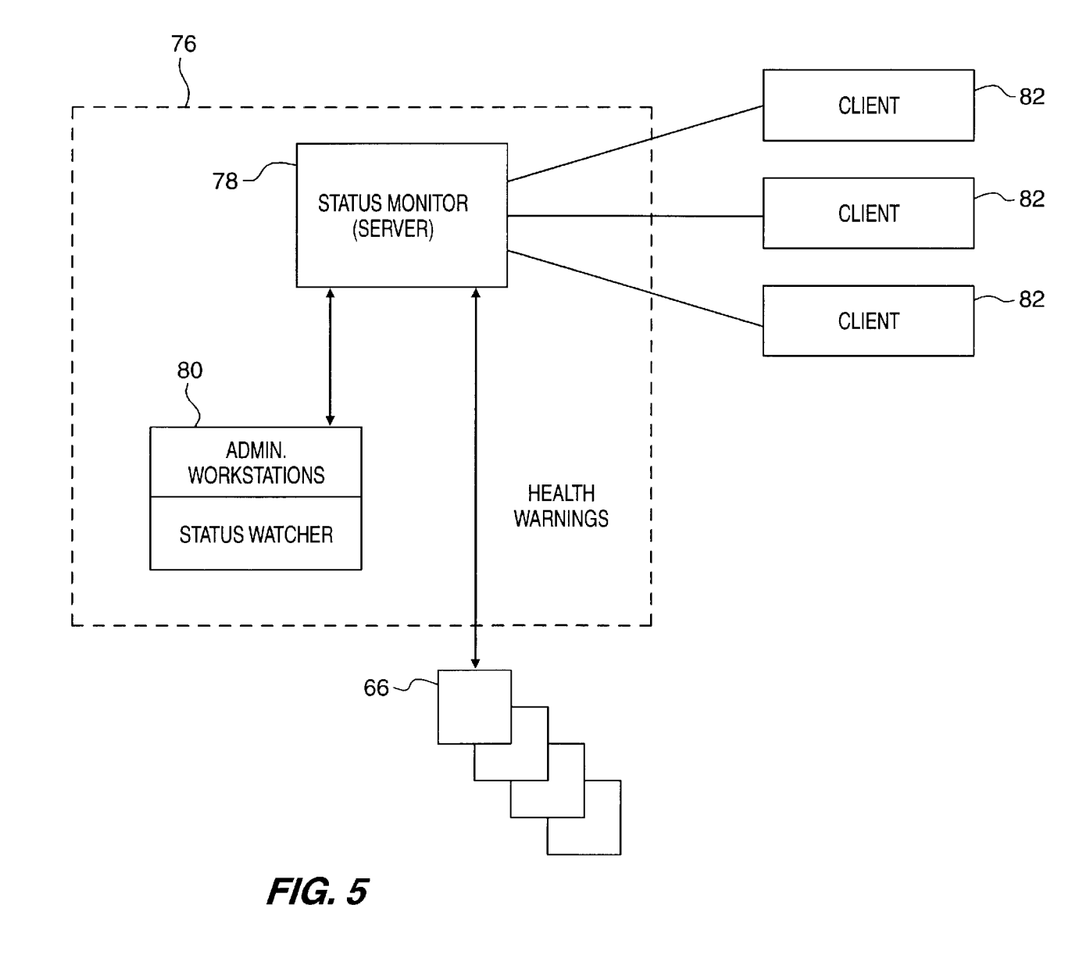
FIG. 5 is a block diagram of the administrative monitoring system shown in FIG. 2.

Finally, in the preferred embodiment, each of the processes running in fraud system 50 is continuously monitored by administrative monitor 76, in order to detect and respond to problems, or abnormalities, in the fraud system. As illustrated by FIG. 5, administrative monitor 76 includes a status monitor 78 (such as a Sun Spark 20 server) operating a status monitor process, and administrator workstations 80. Status monitor 78 is interconnected to communicate with each of the components of fraud system 50 to be monitored. In FIG. 5, these components are generally referred to as clients 82 of the status monitor server 78 but also include fraud workstations 66.

In practice, the components of fraud system 50 run background programs that compile status information particular to the functions performed by the components. In turn, status monitor 78 polls these components periodically and centrally compiles their information for administrative analysis. This status information may include, for example, the number of VLMs received by fraud system 50, the number and size of cases and subcases established by case manager 56, and the state of condition queues. In the preferred embodiment, this information is displayed on administrator workstations 80 and may be regularly saved and printed.

Status monitor 78 applies a set of thresholds or parameters to the status information received from fraud system components. These parameters generally define acceptable levels of performance for the various components or the fraud system generally. Like the indicia discussed above, these parameters are preferably stored in memory as one or more tables or files and may thus be adjusted as necessary without the need to rewrite computer code. By application of these parameters to the status information compiled by status monitor 78, administrative monitor 76 determines whether problems exist in fraud system 50.

In the event administrative monitor 76 detects problems in the operation of the fraud system, the administrative monitor generates a system-wide notice referred to as a "health warning." Health warnings are displayed in real-time by the status watcher program running on administrator workstations 80. In addition, health warnings may be displayed in a status section on the monitors of fraud workstations 66, in order to notify the fraud researchers that a problem exists in fraud system 50. Further, in order to focus the researchers' attention on serious health warnings rather than all health warnings generally, workstations 66 may be customized to receive or display only specified health warnings.

The health warnings that may be generated by administrative monitor 76 include network health warnings and case-based health warnings. Network health warnings reflect problems related to carrying out fraud determinations in the communications network. For instance, if fraud system 50 resolves to block a calling card number and notifies the network SCPMS 52 accordingly, the IXC's network should not permit calls to be made using that card number. Therefore, if VLMs then arrive at fraud system for calls successfully made with the blocked bill number, administrative monitor 76 will issue a network health warning indicating that the network is not properly blocking the bill number. In turn, administrators, researchers or other designated personnel may respond accordingly.

A case-based health warning, in contrast, reflects a significant problem arising in relation to a case. For example, if the number of alerts generated in relation to a case rises above a specified threshold level, administrative monitor 76 will issue a large-case health warning indicating that the case is serious and should be promptly reviewed by researchers. This situation may arise, for example, where a group of criminals has conspired to make multiple simultaneous calls with the same stolen card number, particularly where a no-autostun option has been set for the card number as described above. As VLMs for these fraudulent calls are received by fraud system 50, multiple red or double-red alerts will be generated in a short time frame and appended to a subcase. In response, administrative monitor 76 will issue a large-case health warning, which will enable researchers to expediently pull and analyze the case and block further use of the bill number.

Preferred embodiments of the present invention have been illustrated and described. It will be understood, however, that changes and modifications may be made to the invention without deviating from the spirit and scope of the invention, as defined by the following claims.

We claim:

1. A method for monitoring a fraud prevention system in a telecommunications network, said fraud prevention system comprising a plurality of components arranged to operate a set of fraud system processes, said telecommunications network comprising a switch for receiving and forwarding a call placed using a bill number, said fraud system processes including (i) receiving a record of said call into a computer system, (ii) establishing a likelihood that said call involves fraudulent use of said bill number, and (iii) determining whether to block use of said bill number and, if so, blocking use of said bill number, said method comprising, in combination:

compiling status information regarding operation of said fraud system processes;

determining whether said status information satisfies one or more predefined administrative thresholds; and in response to a determination that said status information satisfies one or more predefined administrative thresholds with respect to a case in said fraud prevention system, generating a case-based health warning defining an abnormality with respect to said case.

2. A method as claimed in claim 1, wherein said case-based health warning comprises a large-case health warning.

3. A method as claimed in claim 1, wherein compiling status information comprises periodically polling said components to obtain status information from said components.

4. A method for monitoring a fraud prevention system in a telecommunications network, said fraud prevention system comprising a plurality of components arranged to operate a set of fraud system processes, said telecommunications network comprising a switch for receiving and forwarding a call placed using a bill number, said fraud system processes including (i) receiving a record of said call into a computer system, (ii) establishing a likelihood that said call involves fraudulent use of said bill number, and (iii) determining whether to block use of said bill number and, if so, blocking use of said bill number, said method comprising, in combination:

compiling status information regarding operation of said fraud system processes;

determining whether said status information satisfies one or more predefined administrative thresholds;

in response to a determination that said status information satisfies one or more of said predefined administrative thresholds, generating a health warning defining an abnormality in said fraud prevention system; and displaying a pre-designated category of health warnings on a workstation monitor to provide notice of said health warnings.

5. A method as claimed in claim 4, wherein said health warning comprises a network health warning.

6. A method as claimed in claim 4, wherein said health warning comprises a case-based health warning.

7. A method as claimed in claim 6, wherein said case-based health warning comprises a large case health warning.

8. A method as claimed in claim 4, wherein compiling status information comprises periodically polling said components to obtain status information from said components.

9. An administrative system for monitoring a fraud prevention process in a telecommunications network, said telecommunications network comprising a switch for receiving and forwarding calls placed using bill numbers, said fraud prevention process being operated by a plurality of components and including (i) receiving records of calls into a computer system, (ii) establishing a level likelihood that use of a bill number is fraudulent, and (iii) if said level of likelihood is higher than a predetermined level, blocking subsequent use of said bill number, said administrative system comprising, in combination:

a computer system interconnected to said components and receiving status information regarding operation of said fraud prevention process; and a set of administrative thresholds defining acceptable performance of said fraud prevention process, whereby said computer system applies said administrative thresholds to said status information to determine whether said status information reflects an abnormality in said fraud prevention system and, in response to a determination that said status information reflects an abnormality with respect to a case in said fraud prevention process, said computer system generates a case-based health warning defining said abnormality.

10. An administrative system for monitoring a fraud prevention process in a telecommunications network, said telecommunications network comprising a switch for receiving and forwarding calls placed using bill numbers, said fraud prevention process being operated by a plurality of components and including (i) receiving records of calls into a computer system, (ii) establishing a level likelihood that use of a bill number is fraudulent, and (iii) if said level of likelihood is higher than a predetermined level, blocking subsequent use of said bill number, said administrative system comprising, in combination:

a computer system interconnected to said components and receiving status information regarding operation of said fraud prevention process, said computer system being further interconnected to a fraud workstation including a monitor;

a set of administrative thresholds defining acceptable performance of said fraud prevention process, whereby said computer system applies said administrative thresholds to said status information to determine whether said status information reflects an abnormality in said fraud prevention process and, in response to a determination that said status information reflects an abnormality in said fraud prevention process, said computer system generates a health warning defining said abnormality, whereby said monitor displays a pre-designated category of health warnings, to provide notice of said health warnings.

11. An administrative system as claimed in claim 10, wherein a human views information displayed on said monitor.

12. An administrative system as claimed in claim 10, wherein said health warning comprises a network health warning.

13. An administrative system as claimed in claim 10, wherein said health warning comprises a case-based health warning.

14. An administrative system as claimed in claim 13, wherein said case-based health warning comprises a large-case health warning.

* * * * *